United States Patent [19]

Tsutsui et al.

[11] Patent Number: 5,641,843
[45] Date of Patent: Jun. 24, 1997

[54] PROCESS FOR POLYMERIZATION OF ALPHA-OLEFINS

[75] Inventors: Toshiyuki Tsutsui, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 560,515

[22] Filed: Nov. 17, 1995

Related U.S. Application Data

[63] Continuation of Ser. No. 409,945, Mar. 23, 1995, abandoned, which is a continuation of Ser. No. 120,846, Sep. 15, 1993, abandoned, which is a continuation of Ser. No. 821,848, Jan. 14, 1992, abandoned, which is a continuation of Ser. No. 355,829, May 22, 1989, abandoned, which is a continuation of Ser. No. 103,582, filed as PCT/JP86/00647, Dec. 23, 1986 published as WO87/03889, Jul. 2, 1987, abandoned.

[30] Foreign Application Priority Data

Dec. 24, 1985 [JP] Japan ................... 60-289389

[51] Int. Cl.⁶ .......... C08F 4/654; C08F 4/655; C08F 4/656; C08F 10/00
[52] U.S. Cl. .......... 526/124.7; 502/120; 526/129; 526/156; 526/153; 526/941; 526/348
[58] Field of Search .......... 526/129, 124.7, 526/153

[56] References Cited

U.S. PATENT DOCUMENTS

| | | | |
|---|---|---|---|
| 3,030,395 | 4/1962 | Giddings | 260/429.5 |
| 3,104,249 | 9/1963 | Clauss et al. | 526/160 |
| 3,242,099 | 3/1966 | Manyik et al. | 526/165 |
| 4,404,344 | 9/1983 | Sinn et al. | 526/160 |
| 4,530,914 | 7/1985 | Ewen et al. | 526/160 |
| 4,542,199 | 9/1985 | Kaminsky et al. | 526/352 |
| 4,564,647 | 1/1986 | Hayashi et al. | 526/160 |
| 4,618,662 | 10/1986 | Nowlin | 526/129 |
| 4,701,432 | 10/1987 | Welborn | 526/114 |
| 4,704,491 | 11/1987 | Tsutsui et al. | 526/160 |
| 5,324,800 | 6/1994 | Welborn et al. | 526/129 |

FOREIGN PATENT DOCUMENTS

| | | | |
|---|---|---|---|
| 220436 | 2/1959 | Australia | 526/160 |
| 129368 | 6/1983 | European Pat. Off. . | |

*Primary Examiner*—Edward J. Smith
*Attorney, Agent, or Firm*—Sherman and Shalloway

[57] ABSTRACT

A process for producing an alpha-olefin polymer, which comprises polymerizing an alpha-olefin in the presence of a catalyst formed from (A) a solid catalyst component comprising an inorganic carrier and deposited thereon a compound of a transition metal of Group IVB of the periodic table treated with an organometallic compound, and (B) an aluminoxane.

1 Claim, No Drawings

PROCESS FOR POLYMERIZATION OF ALPHA-OLEFINS

This application is a continuation of application Ser. No. 08/409,945, filed Mar. 23, 1995; which is a continuation of Ser. No. 08/120,846, filed Sep. 15, 1993; which is a continuation of application Ser. No. 07/821,848, filed Jan. 14, 1993; which is a continuation of application Ser. No. 07/355,829, filed May 22, 1989; which is a continuation of application Ser. No. 07/103,582, filed Aug. 14, 1987; all abandoned; which is the national phase entry based on International Application No. PCT/JP86/00647, filed Dec. 23, 1986, published as WO87/03889, Jul. 2, 1987.

TECHNOLOGICAL FIELD

This invention relates to a process for polymerizing an alpha-olefin in the presence of a highly active polymerization catalyst. Specifically, it relates to a process for polymerizing an olefin in the presence of a catalyst composed of a transition metal compound and an aluminoxane. More specifically, it relates to a process for producing an alpha-olefin polymer, particularly a copolymer of ethylene and an alpha-olefin, having a narrow molecular weight distribution, a narrow composition distribution and a high molecular weight.

BACKGROUND TECHNOLOGY

A process has heretofore been known for producing an alpha-olefin polymer, particularly an ethylene polymer or an ethylene/alpha-olefin copolymer by polymerizing ethylene or copolymerizing ethylene with an alpha-olefin in the presence of a titanium-type catalyst comprising a titanium compound and an organoaluminum compound or a vanadium-type catalyst comprising a vanadium compound and an organoaluminum compound. Generally, ethylene/alpha-olefin copolymers obtained with the titanium-type catalyst have a broad molecular weight distribution and a broad composition distribution. Ethylene/alpha-olefin copolymers obtained with the vanadium-type catalyst have a narrower molecular weight distribution and composition distribution than those obtained with the titanium-type catalyst. In some applications, the ethylene/alpha-olefin copolymers are sometimes desired to have a narrower molecular weight distribution and a narrower composition distribution.

Catalysts comprising zirconium compounds and aluminoxanes were recently proposed as a new Ziegler-type olefin polymerization catalyst.

Japanese Laid-Open Patent Publication No. 19309/,1983 (corresponding to U.S. Pat. No. 4,542,199) discloses a process which comprises polymerizing ethylene with at least one alpha-olefin having 3 to 12 carbon atoms at a temperature of −50° to 200° C. in the presence of a catalyst comprising a transition metal-containing compound represented by the following formula (cyclopentadienyl)$_2$MeR'Hal wherein R' represents cyclopentadienyl, $C_1$–$C_6$ alkyl or halogen, Me represents a transition metal, and Hal represents halogen,
and a linear aluminoxane represented by the following formula

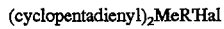

wherein $R^2$ represents methyl or ethyl, and n is a number of 4 to 20, or a cyclic aluminoxane represented by the following formula

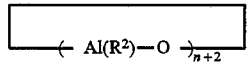

wherein $R^2$ and n are as defined.

This patent document states that to adjust the density of the resulting ethylene copolymer, ethylene should be polymerized in the presence of a small amount (up to 10% by weight) of a slightly long-chain alpha-olefin or a mixture of such alpha-olefins.

Japanese Laid-Open Patent Publication No. 95292/1984 (corresponding to U.S. Pat. No. 4,544,762) describes an invention relating to a process for producing a linear aluminoxane represented by the following formula

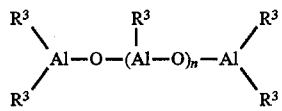

wherein n is 2 to 40 and $R^3$ represents a $C_1$–$C_6$ alkyl group,
and a cyclic aluminoxane represented by the following formula

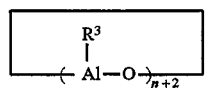

wherein n and $R^3$ are as defined.

This patent document states that when ethylene is polymerized in the presence of a mixture of methylaluminoxane produced by the above process and a titanium or zirconium bis(cyclopentadienyl) compound, polyethylene can be obtained in an amount of at least 25 million grams per gram of the transition metal per hour.

Japanese Laid-Open Patent Publication No. 35005/1985 (corresponding to U.S. Pat. No. 4,536,484) discloses a process for producing an olefin polymerization catalyst, which comprises reacting an aluminoxane compound represented by the following formula

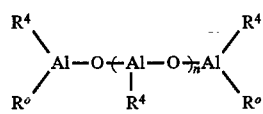

wherein $R^4$ is $C_1$–$C_{10}$ alkyl, and $R^o$ together forms a bivalent —O— radical or represents $R^4$,
with a magnesium compound, chlorinating the reaction product, and treating the chlorinated product with a compound of Ti, V, Zr or Cr. This patent document states that the resulting catalyst is especially suitable for copolymerization of a mixture of ethylene with a $C_3$–$C_{12}$ alpha-olefin.

Japanese Laid-Open Patent Publication No. 35006/1985 (corresponding to European Patent Application No. 128046A) discloses a combination of (a) a mono-, di- or tri-cyclopentadienyl of two or more different transition metals or a derivative thereof and (b) an alumoxane (aluminoxane). Example 1 of this patent document discloses that polyethylene having a number average molecular weight of 15,300 and a weight average molecular weight of 36,400 and containing 3.4% of propylene was obtained by polymerizing ethylene and propylene using bis (pentamethylcyclopentadienyl) zirconium dimethyl and alumoxane. In Example 2, a blend of polyethylene and an ethylene/propylene copolymer having a number average molecular weight of 2,000 and a weight average molecular weight of 8,300 and containing 7.1 mole % of propylene composed of a toluene-soluble portion having a number average molecular weight of 2,200 and a weight average molecular weight of 11,900 and containing 30 mole % of propylene and a toluene-insoluble portion having a number average molecular weight of 3,000 and a weight average molecular weight of 7,400 and containing 4.8 mole % of propylene was obtained by polymerizing ethylene and propylene using bis(pentamethylcyclopentadienyl) zirconium dichloride, bis(methylcyclopentadienyl) zirconium dichloride and alumoxane as a catalyst. Likewise, Example 3 describes a blend of LLDPE and an ethylene/propylene copolymer composed of a soluble portion having a molecular weight distribution ($\overline{Mw}/\overline{Mn}$) of 4.57 and containing 20.6 mole % of propylene and an insoluble portion having a molecular weight distribution of 3.04 and containing 2.9 mole % of propylene.

Japanese Laid-Open Patent Publication No. 35007/1985 (corresponding to European Patent Application No. 129368A) discloses a process which comprises polymerizing ethylene alone or with an alpha-olefin having at least 3 carbon atoms in the presence of a catalyst system comprising a metallocene and a cyclic alumoxane represented by the following formula

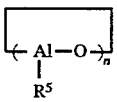

wherein $R^5$ represents an alkyl group having 1 to 5 carbon atoms, and n is an integer of 1 to about 20, or a linear alumoxane represented by the following formula

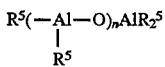

wherein $R^5$ and n are as defined above.

The polymer obtained by this process, according to the description of this patent document, has a weight average molecular weight of about 500 to about 1,400,000 and a molecular weight distribution of 1.5 to 4.0.

Japanese Laid-Open Patent Publication No. 35008/1985 (corresponding to U.S. Pat. No. 4,530,914) describes that polyethylene or an ethylene/$C_3$-$C_{10}$ alpha-olefin copolymer having a broad molecular weight distribution is produced by using a catalyst system comprising at least two metallocenes and alumoxane, and that this copolymer has a molecular weight distribution of 2 to 50.

Japanese Laid-Open Patent Publication No. 35009/1985 (corresponding to U.S. Pat. No. 4,540,753) discloses a process for producing a copolymer of ethylene and an alpha-olefin having a molecular weight distribution of as small as less than 2 by using a catalyst system comprising a vanadium compound and an organoaluminum compound.

It is an object of this invention to provide an industrially advantageous process which can produce an alpha-olefin polymer having a high molecular weight using a novel catalyst comprising a compound of a transition metal of Group IVB of the periodic table and an aluminoxane.

Another object of this invention is to provide a process for producing a homopolymer and a copolymer of an alpha-olefin having a narrow molecular weight distribution and/or a high molecular weight.

Still another object of this invention is to provide a process which can produce a copolymer of an alpha-olefin having a narrow composition distribution and a high molecular weight.

Further objects and advantages of this invention will become apparent from the following description.

DISCLOSURE OF THE INVENTION

According to this invention, these objects and advatanges of the invention are achieved by a process for producing an alpha-olefin polymer, which comprises polymerizing an alpha-olefin in the presence of a catalyst formed from (A) a solid catalyst component comprising a carrier and deposited thereon a compound of a transition metal of Group IVB of the periodic table treated with an organometallic compound, and (B) an aluminoxane.

The term "polymerization", as used in this invention, means both homopolymerization and copolymerization, and likewise, the term "polymer", as used herein, means both a homopolymer and a copolymer.

The catalyst used in this invention is formed from (A) the solid catalyst component and (B) the aluminoxne.

The catalyst component (A) is a solid catalyst component comprising an inorganic carrier and supported thereon a compound of a transition metal of Group IVB of the periodic table which is treated with an organometallic compound.

The transition metal of Group IVB in the catalyst component (A) is preferably selected from titanium, zirconium and hafnium. Titanium and zirconium are more preferred, and zirconium is especially preferred.

As the compound of the transition metal of Group IVB, transition metal compounds having groups containing a π conjugated electron through which these compounds can be bonded to the transition metal are preferred.

Examples of such transition metal compounds are those represented by the following formula (I)

wherein $R^1$ represents a cycloalkadienyl group, $R^2$, $R^3$ and $R^4$ are identical or different and each represents a cycloalkadienyl group, an aryl group, an alkyl group, an aralkyl group, a halogen atom, or a hydrogen atom, Me represents zirconium, titanium or hafnium, k is a number of 1 to 4, l, m and n are positive integers, and k+l+m+n=4.

Examples of the cycloalkadienyl group represented by $R^1$ are cyclopentadienyl, methylcyclopentadienyl, ethylcyclopentadienyl, dimethylcyclopentadienyl, indenyl and tetrahydroindenyl groups.

Examples of the alkadienyl group represented by $R^2$, $R^3$ and $R^4$ may be the same as those given above with regard to $R^1$.

Preferred examples of the aryl group represented by $R^2$, $R^3$ and $R^4$ are phenyl and tolyl groups.

Preferred examples of the aralkyl group represented by $R^2$, $R^3$ and $R^4$ are benzyl and neophyl groups.

Preferred examples of the alkyl group for $R^2$, $R^3$ and $R^4$ include methyl, ethyl, propyl, isopropyl, butyl, hexyl, octyl, 2-ethylhexyl, decyl and oleyl groups.

Examples of the halogen atom for $R^2$, $R^3$ and $R^4$ are fluorine, chlorine and bromine atoms.

Examples of zirconium compounds corresponding to formula (I) in which Me is zirconium include bis(cyclopentadienyl) zirconium monochloride monohydride,
bis(cyclopentadienyl) zirconium monobromide monohydride,
bis(cyclopentadienyl) methylzirconium hydride,
bis(cyclopentadienyl) ethylzirconium hydride,
bis(cyclopentadienyl) cyclohexylzirconium hydride,
bis(cyclopentadienyl) phenylzirconium hydride,
bis(cyclopentadienyl) benzylzirconium hydride,
bis(cyclopentadienyl) neopentylzirconium hydride,
bis(methylcyclopentadienyl) zirconium monochloride monohydride,
bis(indenyl) zirconium monochloride monohydride,
bis(cyclopentadienyl) zirconium dichloride,
bis(cyclopentadienyl) zirconium dibromide,
bis(cyclopentadienyl) methyl zirconium monochloride,
bis(cyclopentadienyl) ethyl zirconium monochloride,
bis(cyclopentadienyl) cyclohexyl zirconium monochloride,
bis(cyclopentadienyl) phenyl zirconium monochloride,
bis(cyclopentadienyl) benzyl zirconium monochloride,
bis(methylcyclopentadienyl) zirconium dichloride,
bis(indenyl) zirconium dichloride,
bis(indenyl) zirconium dibromide,
bis(cyclopentadienyl) zirconium dimethyl,
bis(cyclopentadienyl) zirconium diphenyl,
bis(cyclopentadienyl) zirconium dibenzyl,
bis(cyclopentadienyl) methoxy zirconium chloride,
bis(cyclopentadienyl) ethoxy zirconium chloride,
bis(cyclopentadienyl) butoxy zirconium chloride, and
bis(cyclopentadienyl) 2-ethylhexoxy zirconium chloride.

Examples of titanium compounds corresponding to formula (I) in which Me is titanium include
bis(cyclopentadienyl) titanium chloride,
bis(cyclopentadienyl) methyl titanium chloride, and
bis(cyclopentadienyl) titanium dimethyl.

Examples of hafnium compounds corresponding to formula (I) in which Me is hafnium include
bis(cyclopentadienyl) hafnium dichloride,
bis(cyclopentadienyl) methyl hafnium chloride, and
bis(cyclopentadienyl) hafnium dimethyl.

The compound of the transition metal of Group IVB of the periodic table in the catalyst component (A) is treated with an organometallic compound before deposition. The organometallic compound may, for example, be an organoaluminum, organoboron, organomagnesium, organozinc or organolithium compound. Organometallic compounds in which the hydrocarbon group is directly bonded to the metal are preferred.

Specific examples of the organoaluminum compound are trialkyl aluminums such as trimethyl aluminum, triethyl aluminum and tributyl aluminum; such as isoprenyl aluminum; dialkyl aluminum alkoxides such as dimethyl aluminum methoxide, diethyl aluminum ethoxide and dibutyl aluminum butoxide; alkyl aluminum sesquialkoxides such as methyl aluminum sesquimethoxide and ethyl aluminum sesquiethoxide; partially alkoxylated alkyl aluminums having the average composition of the formula $R_{2.5}^1 Al(OR^2)_{0.5}$ wherein $R^1$ is an alkyl group and $R^2$ is an alkyl group; dialkyl aluminum halides such as dimethyl aluminum chloride, diethyl aluminum chloride and dimethyl aluminum bromide; alkyl aluminum sesquihalides such as methyl aluminum sesquichloride and ethyl aluminum sesquichloride; and alkyl aluminum dihalides such as methyl aluminum dichloride and ethyl aluminum dichloride.

Of these organoaluminum compounds, trialkyl aluminums are preferred, and trimethyl aluminum and triethyl aluminum are especially preferred.

Triethylboron is a preferred example of the organoboron compound.

Examples of the organomagnesium compound are ethyl butyl magnesium, di-n-hexyl magnesium, ethyl magnesium bromide, phenyl magnesium bromide and benzyl magnesium chloride.

Diethylzinc is a preferred example of the organozinc compound.

Examples of the organolithium compound are methyllithium, butyllithium and phenyllithium.

The mixing ratio between the organometallic compound and the compound of the transition metal of Group IVB, as the atomic ratio of Al/transition metal, is from 0.3 to 30, preferably from 0.5 to 20, more preferably from 1 to 10.

The treatment of the group IVB transition metal compound with the organometallic compound is carried out by dissolving or dispersing at least one such transition metal compound in an inert solvent, adding at least one such organometallic compound, and maintaining the mixture at a temperature of 0° to 120° C., preferably 10° to 100° C., more preferably 20° to 80° C., under atmospheric, reduced or elevated pressure for 10 minutes to 10 hours, preferably 20 minutes to 5 hours, more preferably 30 minutes to 3 hours.

The treatment is carried out generally in an organic solvent. Examples of the organic solvent are aliphatic hydrocarbons such as pentane, hexane, heptane, octane, nonane and decane; alicyclic hydrocarbons such as methylcyclopentane, cyclopentane, cyclohexane, cyclooctane, cyclodecane and cyclododecane; and aromatic hydrocarbons such as benzene, toluene, xylene, cumene and cymene. Of these, aromatic hydrocarbons are preferred.

The concentration of the transition metal compound in the treating system is maintained usually at $1\times10^{-4}$ to 0.5 gram-atom/liter, preferably $1\times10^{-3}$ to 0.05 gram-atom/liter.

The concentration of the organometallic compound in the treating system, calculated as the metal atom, is maintained usually at $1\times10^{-4}$ to 3 gram-atom/liter, preferably $1\times10^{-3}$ to 1 gram-atom/liter.

The group IVB transition metal compound treated with the organometallic compound is then deposited on a carrier. The carrier may be an inorganic or organic carrier. Preferably, it is a metal oxide. Specific examples are $SiO_2$, $Al_2O_3$, $MgO$, $ZrO_2$, $TiO_2$, and mixtures of these. The carrier has varying properties depending upon its type and the method of its production. Carriers preferably used in this invention have a particle diameter of 10 to 300 microns, preferably 20 to 200 microns, a specific surface area of 50 to 1,000 $m^2/g$, preferably 100 to 700 $m^2/g$, and a pore volume of 0.3 to 3.0 $cm^3/g$, preferably 0.5 to 2.5 $cm^3/g$. A preferred carrier contains as a main component at least one component selected from the group consisting of $SiO_2$, $Al_2O_3$ and MgO. The inorganic oxide carrier is used usually after it is calcined at 300° to 1,000° C. for 2 to 20 hours.

Examples of the organic carrier include polyolefins such as polyethylene, polypropylene, poly(1-butene) and poly(4-methyl-1-pentene) and aromatic vinyl polymers such as polystyrene. These organic carriers have an average particle diameter of usually 1 to 300 micrometers, preferably 10 to 200 micrometers. The organic carrier is usually dried at room temperature to 100° C. under atmospheric or reduced pressure prior to use.

In the depositing reaction in accordance with this invention, the mixing weight ratio of the IVB transition metal compound to the carrier (transition metal component/carrier) is from 0.5 to 15% by weight, preferably from 0.8 to 10% by weight, more preferably from 1 to 7% by weight.

The deposition reaction may be carried out by adding the inert solvent and the reaction mixture between the group IVB transition metal compound and the organometallic compound to the carrier, and removing the solvent from the mixture by, for example, an evaporator under atmospheric or reduced pressure at room temperature or at an elevated temperature.

The catalyst component (B) is an aluminoxane.

Examples of the aluminoxane are organoaluminum compounds represented by the following formulae (II) and (III).

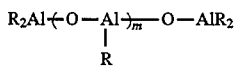

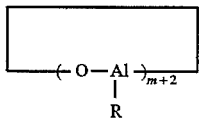

wherein R represents a hydrocarbon group, and m represents an integer, preferably an integer of at least 20, especially preferably an integer of at least 25.

In formulae (II) and (III), R represents a hydrocarbon group such as an alkyl, cycloalkyl, aryl or aralkyl group. Preferred alkyl groups are lower alkyl groups such as methyl, ethyl, propyl and butyl groups. Cyclopentyl and cyclohexyl groups are preferred cycloalkyl groups. The aryl is preferably a phenyl or tolyl group. Examples of preferred aralkyl groups are benzyl and neophyl groups. Among these, the alkyl groups are especially preferred.

In formulae (II) and (III), m is a positive integer, preferably an integer of at least 20, particularly preferably an integer of at least 25, above all an integer of 30 to 100.

The aluminoxane can be produced, for example, by the following methods.

(1) A method which comprises adding a trialkyl aluminum to a suspension of a compound containing water of adsorption or a salt containing water of crystallization, such as magnesium chloride hydrate, copper sulfate hydrate, aluminum sulfate hydrate, nickel sulfate hydrate or cerium (III) chloride hydrate, in a hydrocarbon medium and reacting them.

(2) A method which comprises allowing water to act directly on a trialkyl aluminum in a medium such as benzene, toluene, ethyl ether or tetrahydrofuran.

The method (1) is preferably employed. The aluminoxane may contain a small amount of an organometallic component.

The catalyst used in the process of this invention can be formed by contacting the transition metal compound catalyst component (A) with the catalyst component (B). The catalyst may be formed in a polymerization reaction vessel before or after introduction of the alpha-olefin.

Preferred examples of the alpha-olefin to be polymerized include alpha-olefins having 2 to 20 carbon atoms such as ethylene, propylene, 1-butene, 4-methyl-1-pentene, 1-hexene, 1-octene, 1-decene, 1-dodecene, 1-tetradecene, 1-hexadecene, 1-octadecene and 1-eicocene.

This invention is effective for the production of an ethylene polymer, particularly a copolymer of ethylene and another alpha-olefin. In the production of the ethylene copolymer, the starting monomeric mixture usually contains 10 to 99 mole %, preferably 20 to 98 mole %, of ethylene and 1 to 90 mole %, preferably 2 to 80 mole %, of the alpha-olefin, In the process of this invention, the alpha-olefin polymerization reaction may be carried out by a gas-phase polymerization method or a liquid-phase polymerization method. In either case, the polymerization reaction may, as required, be carried out in the presence of a hydrocarbon medium. For example, the gas-phase polymerization method is carried out in the optional presence of a diluent composed of the hydrocarbon medium, and the liquid-phase polymerization may be carried out in the optional presence of a solvent composed of the hydrocarbon medium.

Specific examples of the hydrocarbon medium include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and light oils. The starting olefin can also be the hydrocarbon medium.

When the process of this invention is carried out by a liquid-phase polymerization technique such as a suspension-polymerization or solution-polymerization technique, the temperature employed in the polymerization reaction is usually $-50°$ to $200°$ C., preferably $-30°$ to $150°$ C., especially preferably $-20°$ to $120°$ C.

In the process of this invention carried out by the liquid-phase polymerization technique, the amount of the transition metal compound is usually $10^{-8}$ to $10^{-2}$ gram-atom/liter, preferably $10^{-7}$ to $10^{-3}$ gram-atom/liter, as the transition metal atom, in the polymerization reaction system. The amount of the aluminoxane is usually $10^{-4}$ to $10^{-1}$ gram/atom/liter, preferably $10^{-3}$ to $5\times10^{-2}$ gram-atom/liter, as the concentration of the aluminum atom in the polymerization system. The ratio of the aluminum metal atom to the zirconium metal atom in the polymerization reaction system is usually from 25 to $10^7$, preferably from $10^2$ to $10^6$. The molecular weight of the polymer may be controlled by hydrogen and/or the polymerization temperature.

In the process of this invention, the desired alpha-olefin polymer such as an ethylenic copolymer, may be obtained by treating the polymerization reaction mixture in a customary manner after the polymerization reaction.

The ethylenic polymer in accordance with this invention contains 35 to 100% by weight, preferably 40 to 100% by weight, of the ethylene component and 0 to 65% by weight, preferably 0 to 60% by weight, of the alpha-olefin component.

The ethylenic polymer in accordance with this invention has an MFR, measured at $190°$ C. under a load of 2.16 kg, of 0.001 to 200 g/10 min., preferably 0.005 to 100 g/10 min.

Usually, the alpha-olefin polymer, such as an ethylenic copolymer, in accordance with this invention has a molecular weight distribution ($\overline{Mw}/\overline{Mn}$), measured by gel permeation chromatography (GPC), of not more than 2.5, preferably not more than 2.3, especially preferably not more than 2. If the molecular weight distribution becomes larger than 2.5, a composition prepared by incorporating the alpha-olefin polymer as a modifier has increased tackiness or undergoes blocking. Hence, the molecular weight distribution is desirably within the above-specified range.

The molecular weight distribution ($\overline{Mw}/\overline{Mn}$) is measured as follows in accordance with Takeuchi, "Gel Permeation Chromatography" published by Maruzen Co., Ltd., Tokyo.

(1) The GPC count of standard polystyrene (monodisperse polystyrene made by Toyo Soda Co., Ltd.) of known molecular weight M is measured, and a calibration curve for the molecular weight M versus the elution volume is drawn. The concentration of standard polystyrene at this time is adjusted to 0.02% by weight.

(2) A gel permeation chromatograph of a sample polymer is taken by GPC measurement. From the calibration curve mentioned in (1) above, the number average molecular weight $\overline{Mn}$ and the weight average molecular weight $\overline{Mw}$ of the sample are calculated. The $\overline{Mw}/\overline{Mn}$ is thus obtained. The conditions for sample preparation and GPC measurement are as follows:

Sample preparation (a) The sample is put in an Erlenmeyer flask together with o-dichlorobenzene as a solvent so that its concentration becomes 0.1% by weight.

(b) The Erlenmeyer flask is heated to 140° C., and the mixture is stirred for about 30 minutes to form a solution.

(c) The polymer solution is subjected to GPC.

GPC measurement

The measurement is conducted under the following conditions.

(a) Device: 150C-ALC/GPC made by Waters Co.
(b) Column: GMH type made by Toyo Soda Co., Ltd..
(c) Amount of the sample: 400 microliters
(d) Temperature: 140° C.
(e) Flow rate: 1 ml/min.

The alpha-olefin polymer, such as an ethylenic random copolymer, obtained by the process of this invention has a boiling methyl acetate-soluble content of not more than 2% by weight, preferably 1.5 to 0.01% by weight, especially preferably 1.0 to 0.03% by weight, especially preferably 0.7 to 0.05% by weight. When the weight fraction of the ethylene units of the ethylenic random copolymer is $P_{EW}$, the ethylenic random copolymer has a boiling methyl acetate-soluble content ($E_x$ % by weight) of preferably $E_x \leq 2.2 - 2 \times P_{EW}$, more preferably $E_x \leq 1.35 - P_{EW}$, especially preferably $E_x \leq 0.9 - 0.6 \times P_{EW}$.

Extraction with boiling methyl acetate is carried out by molding the sample polymer into a press sheet having a thickness of 1 mm, cutting the press sheets into square pieces having a size of 2 mm×2 mm, placing the pieces in a cylindrical glass filter, and extracting the pieces with boiling methyl acetate for 6 hours by a Soxhlet extractor at a reflux frequency of about one per 5 minutes. The amount of extract is determined by drying the extraction residue to a constant weight by a vacuum dryer.

The alpha-olefin polymer, such as an ethylenic random copolymer, obtained by the process of this invention usually has a density of not more than 0.95 g/cc. The density of the sample is measured after heat-treating it for 1 hour at 120° C. and gradually cooling it to room temperature over 1 hour.

Furthermore, the ethylenic copolymer of this invention has a B value, defined by the following equation (IV), within the range defined by the following equation (V)

$$B \equiv \frac{P_{OE}}{2P_O \cdot P_E} \quad (P_o \neq 0) \tag{IV}$$

wherein $P_E$ represents the molar fraction of the ethylene component in the copolymer, $P_O$ is the molar fraction of the alpha-olefin component in the copolymer, $P_{OE}$ is the molar fraction of alpha-olefin/ethylene chains in the total dyad chains.

$$1.00 \leq B \leq 2 \tag{V}$$

The B value is an index showing the state of distribution of the individual monomer components in the copolymer chain, and can be calculated from $P_E$, $P_O$ and $P_{OE}$ which are measured on the basis of G. J. Ray, Macromolecules, 10, 773 (1977), J. C. Randall, Macromolecules, 15, 353 (1982), J. Polymer Science, Polymer Physics Ed., 11, 275 (1973), and K. Kimura, Polymer, 25, 441 (1984).

As the B value is larger, the copolymer has less blocked chains, a more uniform distribution of ethylene and alpha-olefin and a narrower composition distribution.

Preferably, the ethylenic copolymer in accordance with this invention has the following B values.

When the copolymer has an ethylene content of not more than 50 mole %:

$1.0 + 0.3 \times P_E \leq B \leq 1/(1 - P_E)$ more preferably $1.0 + 0.4 \times P_E \leq B \leq 1/(1 - P_E)$, especially preferably $1.0 + 0.5 \times P_E \leq B \leq 1/(1 - P_E)$, When the copolymer has an ethylene content of more than 50 mole %:

$1.3 - 0.3 \times P_E \leq B \leq 1/P_E$, more preferably $1.4 - 0.4 \times P_E \leq B \leq 1/P_E$, especially preferably $1.5 - 0.5 \times P_E \leq B \leq 1/P_E$.

The B value was determined as follows:

A sample is prepared by uniformly dissolving about 200 mg of the copolymer in 1 ml of hexachlorobutadiene in a sample tube having a diameter of 10 mm. The $^{13}$C-NMR spectrum of the sample is usually measured under the following conditions.

Temperature: 120° C.

Frequency: 25.05 MHz

Spectral width: 1500 Hz

Filter width: 1500 Hz

Pulse repeating time: 4.2 sec

Pulse width: 7 microseconds

Integration cycles: 2000 to 5000

$P_E$, $P_O$ and $P_{OE}$ are determined from the spectrum, and the B value is calculated from these.

In the $^{13}$C-NMR spectrum of the ethylenic copolymer of this invention, signals of $\alpha\beta$ and $\beta\gamma$ based on a methylene chain between two adjacent tertiary carbon atoms in the main chain of the copolymer are substantially not observed.

For example, in the following bond of a copolymer of ethylene and 1-hexene, the three central methylene groups are at the positions of $\alpha$, $\beta$, and $\gamma$ from left when viewed from the left tertiary carbon derived from 1-hexene, and on the other hand, at the positions of $\alpha$, $\beta$, and $\gamma$ from right when viewed from the right tertiary carbon. Hence, the above bond unit contains methylene groups which give signals of $\alpha\gamma$ and $\beta\beta$, but contains no methylene group which gives signals of $\alpha\beta$ and $\beta\gamma$.

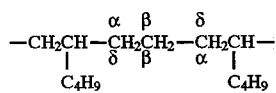

Likewise, in the following bond in which 1-hexenes are bonded head-to-tail

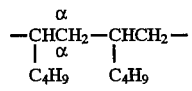

methylene groups which give signals of $\alpha\alpha$ exist, and there is no methylene group which gives a signal of $\alpha\beta$ and $\beta\gamma$.

On the other hand, the following bonds

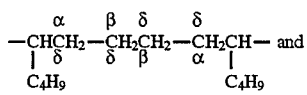

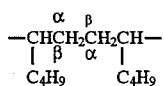

have methylene groups which give a signal of βγ and a signal of αβ.

It is apparent from the foregoing description that in the ethylenic copolymer of this invention, the direction of bonding of a monomer copolymerizable with ethylene is regular.

An alpha-olefin polymer, such as an ethylenic random copolymer, obtained by the process of this invention has a narrower molecular weight distribution than copolymers obtained by using the titanium-type catalyst. When the alpha-olefin polymer is an ethylenic random copolymer, it has a narrow composition distribution and excellent transparency, surface non-tackiness and dynamic properties. The alpha-olefin polymer in accordance with this invention has nearly the same, or a narrower, molecular weight distribution and composition distribution as, or than, a copolymer obtained by using the vanadium-type catalyst but the state of arrangement of the copolymer components in the molecular chain may be said to be different.

Furthermore, the process of this invention can give an alpha-olefin polymer, particularly a copolymer of ethylene and an alpha-olefin, having a higher molecular weight than an alpha-olefin polymer produced by using a catalyst in accordance with this invention in which however the group IVB transition metal compound is not supported on the inorganic carrier.

Also, the process of this invention can give an alpha-olefin copolymer, especially a copolymer of ethylene and an alpha-olefin, having a higher molecular weight than an alpha-olefin polymer obtained by using a catalyst in accordance with this invention in which however the group IVB transition metal compound is not treated with an organometallic compound.

Molded articles of alpha-olefin copolymers such as ethylenic random copolymers obtained by this invention are free from tackiness and have various other good properties as stated above. These polymers can be molded into pipes, films, sheets, hollow containers and other various articles by any desired molding methods such as extrusion, blow molding, injection molding, press forming, and vacuum forming, and can be used in various applications. Since the ethylenic random copolymers have good transparency, antiblocking property and heat sealability, they are suitable for use as a packaging film. They are also suitably used as a protective film for metal, etc. because of the foregoing properties.

Best mode for practicing the invention

The following Examples illustrate the process of this invention more specifically.

EXAMPLE 1

Preparation of a catalyst component (A) (zirconium catalyst component):

Trimethyl aluminum (1.2 mmoles) was added to 60 ml of a toluene solution of bis(cyclopentadienyl) zirconium dichloride (Zr 0.02 mole/liter), and the mixture was stirred at room temperature for 1 hour. Toluene (60 ml) and the resulting zirconium-aluminum solution were added to 4.5 g of silica (average partricle diameter 60 microns, specific surface area 600 m²/g) which had been calcined at 500° C. for 6 hours, and the mixture was stirred for 10 minutes and then heated to 110° C. Toluene was removed from the mixture by an evaporator. A period of 1 hour was required until toluene was completely removed. The resulting pale yellow solid was slurried with toluene and used in the polymerization to be described. No zirconium was detected from the supernatant of the slurry, and all the zirconium was deposited on silica.

Preparation of a catalyst component (B) (aluminoxane):

A 200 ml flask fully purged with argon was charged with 7.4 g of $Al_2(SO_4)_3 \cdot 14H_2O$ and 25 ml of toluene. After cooling the contents to 0° C., 100 millimoles of trimethylaluminum diluted with 25 ml of toluene was added dropwise. The mixture was heated to 40° C., and maintained at this temperature for 20 hours. After the reaction, the reaction mixture was subjected to solid-liquid separation by filtration. The separated liquid was used in the polymerization as an aluminoxane solution. Toluene was removed from a portion of the separated liquid, and the residue was used as a sample for molecular weight measurement. The molecular weight of the sample determined by freezing point depression in benzene was 1350, and the m value shown in the catalyst component (B) was 21.

Polymerization:

A 500 ml glass autoclave thoroughly purged with nitrogen was charged with 250 ml of purified toluene. A gaseous mixture of ethylene and propylene (60 liters/hr and 40 liters/hr respectively) was passed through the autoclave, and maintained at 20° C. for 10 minutes. Subsequently, the aluminoxane [catalyst component (B)] in an amount of 0.5 milligram-atom as the aluminum atom and the catalyst component (A) in an amount of $1.25 \times 10^{-3}$ milligram-atom as the zirconium atom were introduced into the autoclave, and the polymerization of the ethylene/propylene gaseous mixture was started. After the polymerization was carried out at 20° C. under atmospheric pressure for 1 hour, isopropanol was added to stop the polymerization. The polymer solution was added to a large amount of methanol to precipitate the polymer, and the precipitated polymer was dried overnight under reduced pressure at 130° C. The amount of the polymer obtained after drying was 4.3 g, and the activity per unit of zirconium was 3440 g of polymer/milligram-atom of Zr. The polymer had an ethylene content of 76% by weight, a MFR of 1.9 g/10 min., a $\overline{Mw}/\overline{Mn}$ of 1.93 and a B value of 1.18.

The boiling methyl acetate soluble content of the polymer was 0.38% by weight.

COMPARATIVE EXAMPLE 1

Example 1 was repeated except that bis(cyclopentadienyl) zirconium dichloride dissolved in toluene was used as the catalyst component (A). The results are shown in Table 1.

COMPARATIVE EXAMPLE 2

Preparation of a catalyst component (A):

Example 1 was repeated except that 120 ml of a toluene solution of bis(cyclopentadienyl) zirconium dichloride (Zr= 0.01 mole/liter) was used without treatment with trimethyl aluminum, and added to 4.5 g of the same silica as used in Example 1. The resulting pale violet solid was slurried with toluene and used in the polymerization. No zirconium was detected from the supernatant of the slurry, and all the zirconium was deposited on silica.

Polymerization:

The polymerization was carried out as in Example 1 except that the resulting catalyst component (A) was used instead of the catalyst component (A) used in Example 1. The results are shown in Table 1.

EXAMPLE 2

Preparation of a catalyst component (A):

Triethyl aluminum (2.4 millimoles) was added to 60 ml of a toluene solution of bis(cyclopentadienyl) zirconium dichloride (Zr 0.02 mole/liter), and the mixture was reacted at room temperature for 1 hour. Then, 50 ml of toluene and the resulting zirconium-aluminum solution were added to 5.0 g of the same silica as used in Example 1. The mixture was worked up as in Example 1.

Polymerization:

A 500 ml glass autoclave fully purged with nitrogen was charged with 250 ml of purified toluene. A gaseous mixture of ethylene and propylene (90 liters/10 hours and 10 liters/ hour, respectively) was passed through the autoclave, and maintained at 40° C. for 10 minutes. Subsequently, the aluminoxane synthesized in Example 1 in an amount of 1.25 milligram-atom as the aluminum atom and the catalyst component (A) in an amount of $1.25 \times 10^{-3}$ milligram-atom as the zirconium atom were introduced into the autoclave, and the polymerization of the ethylene/propylene gaseous mixture was started. The polymerization was carried out at 40° C. under atmospheric pressure for 0.5 hour, and then stopped by adding isopropanol. The reaction mixture was worked up as in Example 1. The results are shown in Table 1.

EXAMPLE 3

Preparation of a catalyst component (B):

A 200 ml flask purged fully with argon was charged with 28 g of $MgCl_2.6H_2O$ and 25 ml of toluene. After the contents were cooled to 0° C., 50 millimoles of trimethyl aluminum diluted with 25 ml of toluene was added dropwise. Subsequently, the contents were heated to 70° C., and at this temperature, the reaction was continued for 80 hours. After the reaction, the reaction mixture was subjected to solid-liquid separation by filtration, and the separated liquid was used in the polymerization as an aluminoxane solution. Toluene was removed from a portion of the separated liquid and the residue was used as a sample for molecular weight measurement. The molecular weight determined by freezing point depression in benzene was 1680, and its m value shown in the catalyst component (B) was 27.

Polymerization

A 500 ml glass autoclave fully purged with nitrogen was charged with 230 ml of purified toluene and 20 ml of 4-methyl-1-pentene. Ethylene gas was passed through the autoclave at a rate of 100 liters/hr, and maintained at 60° C. for 10 minutes. Subsequently, the aluminoxane synthesized as above [catalyst component (B)] in an amount of 2.5 milligram-atom as the aluminum atom and the catalyst component (A) synthesized in Example 1 in an amount of $5 \times 10^{-4}$ milligram-atom as the zirconium atom were introduced into the autoclave, and the polymerization of ethylene was started. The polymerization was carried out at 60° C. under atmospheric pressure for 0.5 hour. The reaction mixture was worked up as in Example 1. The results are shown in Table 1.

COMPARATIVE EXAMPLE 3

Example 3 was repeated except that the catalyst component (A) synthesized in Comparative Example 2 was used instead of the catalyst component (A) synthesized in Example 1. The results are shown in Table 1.

EXAMPLE 4

Preparation of the catalyst component (A):

To 60 ml of toluene was added 1.5 millimoles of bis (cyclopentadienyl) zirconium monochloride monohydride was added, and furthermore, 3.0 millimoles of trimethyl aluminum was added. The mixture was reacted at 60° C. for 1 hour while shutting off light. The same silica as used in Example 1 (5.0 g) and 60 ml of toluene were added to the resulting solution, and the mixture was worked up as in Example 1. By this operation, all zirconium was deposited on silica.

Polymerization:

The polymerization was carried out as in Example 1 except that 0.5 milligram-atom, as the aluminum atom, of the aluminoxane synthesized in Example 3 was used instead of the aluminoxane synthesized in Example 1. The results are shown in Table 1.

EXAMPLE 5

Example 1 was repeated except that silica (average particle diameter 70 microns, specific surface area 300 $m^2/g$) which had been calcined at 600° C. for 6 hours was used instead of the silica used in Example 1. The results are shown in Table 1.

EXAMPLE 6

Preparation of a catalyst component (A):

Example 1 was repeated except that silica-alumina (average particle diameter 80 microns, specific surface area 600 $m^2/g$, alumina content 12% by weight) was used instead of the silica. All zirconium was deposited on silica-alumina.

Polymerization:

The polymerization was carried out in the same way as in Example 1 except that the resulting catalyst component (A) was used instead of the catalyst component (A) used in Example 1 and the aluminoxane was used in an amount of 1.25 milligram-atom as the aluminum atom. The results are shown in Table 1.

EXAMPLE 7

Preparation of a catalyst component (A):

Example 1 was repeated except that silica-magnesia (average particle diameter 80 microns, specific surface area 200 $m^2/g$, magnesia content 11% by weight) was used instead of silica. All zirconium was deposited on silica-magnesia.

Polymerization:

The polymerization was carried out in the same way as in Example 1 except that the resulting catalyst component (A) was used instead of the catalyst component (A) used in Example 1 and the aluminoxane was used in an amount of 1.25 milligram-atom as the aluminum atom. The results are shown in Table 1.

COMPARATIVE EXAMPLE 4

Preparation of a catalyst component (A):

Example 1 was repeated except that 12 milli-gram-atom, as the aluminum atom, of the aluminoxane synthesized in Example 1 was used instead of trimethyl aluminum. All zirconium was deposited on silica.

Polymerization:

The polymerization was carried out in the same way as in Example 1 except that the resulting catalyst component (A) was used instead of the catalyst component (A) used in Example 1. The results are shown in Table 1.

TABLE 1

| | Amount of the polymer yielded (g) | Activity (g-polymer/ mg-atom-Zr) | Ethylene content (wt. %) | MFR (g/10 min.) | Density (g/cm³) | $\bar{M}w/\bar{M}n$ | B value | Boiling methyl acetate-soluble content (wt. %) |
|---|---|---|---|---|---|---|---|---|
| Example | | | | | | | | |
| 1 | 4.3 | 3,440 | 76 | 1.9 | — | 1.93 | 1.18 | 0.38 |
| 2 | 3.5 | 2,800 | — | 0.13 | 0.939 | — | — | — |
| 3 | 6.8 | 13,600 | — | 0.52 | 0.924 | 2.07 | — | — |
| 4 | 4.0 | 3,200 | 77 | 1.8 | — | 2.01 | 1.16 | 0.40 |
| 5 | 4.0 | 3,200 | 78 | 2.1 | — | 1.98 | 1.15 | 0.39 |
| 6 | 5.1 | 4,080 | 76 | 1.6 | — | 1.99 | 1.17 | 0.42 |
| 7 | 4.9 | 3,920 | 78 | 2.1 | — | 2.11 | 1.14 | 0.43 |
| Comparative Example | | | | | | | | |
| 1 | 14.7 | 11,800 | 74 | 7.0 | — | 1.96 | 1.18 | 0.36 |
| 2 | 2.1 | 1,680 | 76 | 8.2 | — | 2.05 | 1.17 | 0.41 |
| 3 | 3.3 | 6,600 | — | 3.8 | 0.927 | 2.18 | — | — |
| 4 | 3.8 | 3,040 | 78 | 1.4 | — | 3.14 | 1.12 | 0.56 |

Peaks attributed to αβ and βγ were not observed in the ¹³C-NMR spectra of the polymers obtained in the foregoing Examples and Comparative Examples.

Industrial utilizability

According to the process of this invention, a homopolymer and a copolymer of an alpha-olefin having a narrow molecular weight distribution, narrow composition distribution and a high molecular weight can be obtained.

We claim:

1. A process for producing an alpha-olefin polymer selected from the group consisting of ethylene homopolymer and a copolymer of ethylene and an alpha-olefin having 3 to 8 carbon atoms, wherein said copolymer contains at least 40% by weight of ethylene component, said process comprising:

polymerizing an alpha-olefin selected from the group consisting of ethylene and a mixture of ethylene and an alpha-olefin having 3 to 8 carbon atoms in the presence of a catalyst formed from:

(A) a solid catalyst component prepared by contacting
(1) an inorganic carrier selected from the group consisting of $SiO_2$, $Al_2O_3$, MgO and mixtures thereof which has been calcined at 300° to 1000° C. for 2 to 20 hours, with
(2) a reaction mixture, said reaction mixture formed from having reacted
(a) a zirconium metal compound with
(b) an organoaluminum compound, said zirconium metal compound represented by the formula $$R^1R^2R^3R^4Zr$$

wherein $R^1$ and $R^2$ are identical or different and each represents a cycloalkadienyl group, and $R^3$ and $R^4$ are identical or different and each represents an aryl group, an alkyl group, an aralkyl group or a hydrogen atom, said organoaluminum compound being selected from the group consisting of trialkyl aluminums, dialkyl aluminum alkoxides, alkyl aluminum sesquialkoxides, partially alkoxylated alkyl aluminums having the average composition of the formula $$R^5{}_{2.5}Al(OR^6)_{0.5}$$

wherein $R^5$ is an alkyl group and $R^6$ is an alkyl group said organoaluminum compound being present in said reaction mixture in an amount such that the atomic ratio of the metal of said organoaluminum compound to the zirconium metal is from 0.3 to 30; and (B) an aluminoxane represented by the following formula

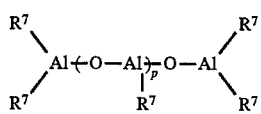

wherein $R^7$ represents a hydrocarbon group and p is a positive integer, or by the following formula

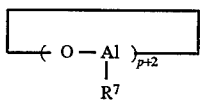

wherein $R^7$ and p are as defined above.

* * * * *